Oct. 13, 1925.
L. S. WHITNEY
METHOD OF MAKING AUGER BITS
Filed Nov. 11, 1924
1,556,655
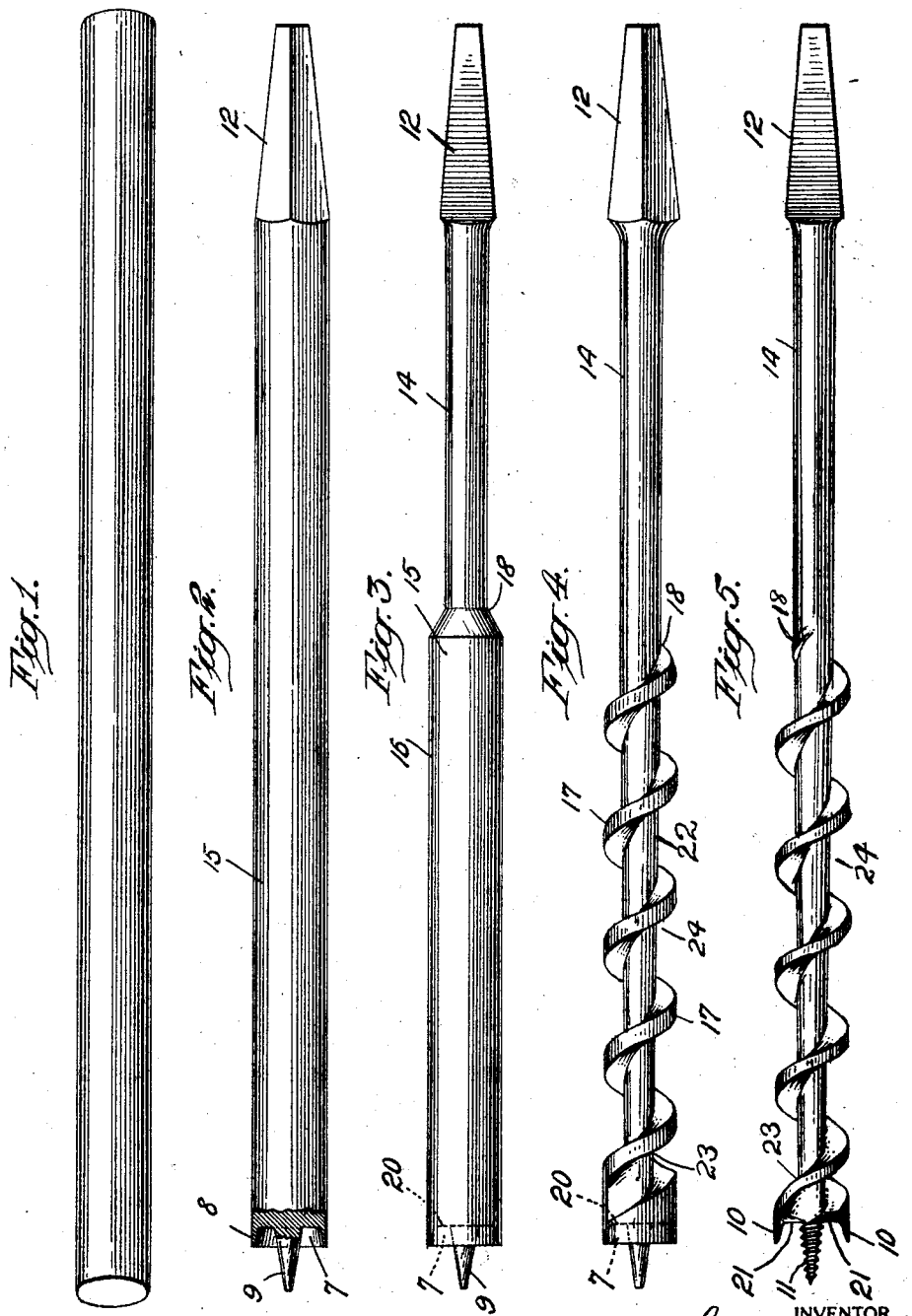

Patented Oct. 13, 1925.

1,556,655

UNITED STATES PATENT OFFICE.

LARNED S. WHITNEY, OF FISKDALE, MASSACHUSETTS.

METHOD OF MAKING AUGER BITS.

Application filed November 11, 1924. Serial No. 749,114.

*To all whom it may concern:*

Be it known that I, LARNED S. WHITNEY, a citizen of the United States, residing in Fiskdale, in the county of Worcester and State of Massachusetts, have invented certain new and useful Improvements in Methods of Making Auger Bits, of which the following is a specification.

The invention relates to a method of making auger bits.

The more commonly practised method of producing auger bits at the present time is by forging with trip-hammers and drop-hammers. According to this method a relatively short piece of steel is heated and then subjected to a series of forging dies by which it is hammered into a bit blank in condition for machining. After the forging operation it is necessary to ascertain whether the bit blank is free from fire cracks, forging defects, and whether it is of proper length and size. The bit blank is then subjected to a series of machining operations by which the spurs, lips and lead screw are cut and the bit ground and polished. Forged bits vary considerably in length, diameter and general condition, so much so in fact that it is often impracticable to employ jigs or other fixtures for performing the operations of cutting the lips, spurs and lead screw. Consequently, these operations must often be performed entirely by hand, thereby greatly increasing the cost of producing the bit. Moreover, forged bits are often defective in that the shank and spiral are not concentric with the lead screw and spurs, so that the bit does not run true when it is put in the brace or bit-stock. Such is the percentage of imperfect auger bits produced by the present method of forging that the bits returned to the factories by the trade because of various kinds of defects is a source of serious loss to the manufacturers.

The object of the present invention is to produce a method of manufacturing auger bits by which the bits will be more uniformly accurate in length and diameter, will be free from fire and forging defects, and will be superior in general condition and construction to forged bits. To this end the bit is produced entirely by a series of machine operations from a rod or bar of stock of the requisite size, usually slightly larger in diameter than the finished bit. By making the bits from a round bar by a series of operations performed on different machines, some of the operations being entirely automatic, the bit blanks produced by the first of the series of operations will be so uniform in size and general condition that the subsequent operations of cutting the spurs, lips and lead screw, may all be accomplished in jigs or other fixtures. Moreover, by machining all the parts of the bit, such as the spiral, the shank and the nib or tang, which have formerly been fashioned by forging, the operation of grinding and polishing the bit is more quickly and easily performed, thereby greatly reducing the cost of producing the finished bit.

The accompanying drawings illustrate the various steps in producing auger bits by the method of the present invention:—Fig. 1 is a perspective view of a bar of stock from which the bit is produced; Fig. 2 shows the bar after the forward end has been operated on to blank out the parts for the spurs, lips and lead screw, and the tang has been cut on the other end; Fig. 3 shows the blank with the shank turned down thereon; Fig. 4 shows the blank after the spiral has been cut; and Fig. 5 is a view of the finished bit.

In producing an auger bit according to the method of the present invention, a bar of round stock slightly larger in diameter than the finished bit is first placed in a lathe and the end projecting from the chuck is countersunk, as shown at 7 in Fig. 2, so as to form the annulus 8 and the cone 9 from which the spurs 10 and lead screw 11 (Fig. 5) are made. Preferably an automatic turret lathe is used and the bar of round stock is of such length that several bit blanks may be cut from it. After the projecting end of the bar is countersunk the shank portion may be turned down while the stock is still in the turret lathe. I prefer, however, to cut off the bit blank when the forward end has been countersunk and to turn down the shank portion after the tang or nib has been cut, so as not to subject the relatively slender shank portion to the stresses incident to the cutting of the tang.

The bit blank having been cut to length in the turret lathe is next placed in a milling machine and the tapered tang or nib 12 is cut on the end which is to be inserted in the brace or bit-stock. The bit blank now exists as shown in Fig. 2. The shank portion 14 (Fig. 3) is next turned down in a lathe, after which the body portion 15 is turned to size, leaving just enough stock for the grinding and polishing operations after the spiral 17 (Fig. 4) has been cut.

The bit blank 16, which now exists as shown in Fig. 3, is then placed in a machine by which the stock between the walls 17 forming the spiral is removed. This operation is preferably performed by oppositely-disposed cutters in a milling machine, one such machine forming the subject-matter of my co-pending application, Serial No. 749,115, filed November 11, 1924. It will be noted that the cutters which cut the spiral begin the milling operation at the point 18 where the body part 15 of the bit joins with the shank 14 and proceed only as far as the bottom 20 of the countersunk recess 7, so as to leave sufficient stock from which the spurs 10 and lips or cutting edges 21 may be formed.

The center stem or core 22 (Fig. 4) of the spiral cut 24 may be straight from the point 18 to the point 23. It is preferred however to have this center stem taper slightly from the point 18 toward the point 23, as in the bits which have heretofore been produced by the forging processes. By having the center stem of the spiral portion of the bit taper from the point 18 toward the point 23, the middle of the bit where the greater stresses come is strengthened. Moreover, by tapering the center stem of the spiral portion of the bit the operative is enabled to properly cut the spiral without sinking the cutters into the shank.

All the foregoing operations, including the forming of the tang and the cutting of the spiral, having been performed on a bar of stock, the diameter of which is substantially the same throughout its length, the bit blank shown in Fig. 4 is in such condition that the subsequent operations of cutting and finishing the spurs, lips or cutting edges, and the lead screw, may be all performed by machine while the bit blank is held in a jig or other fixture. Thus these operations will be uniformly performed and the parts of all the bits produced by them will be uniform in size. The bits are now ready for hardening, tempering, grinding, polishing and sharpening, all of which operations are performed in the usual manner. The shank 14 and spiral 17 having been cut by machine, it will be obvious that the operations of grinding and polishing these parts are more easily and quickly effected than when the bit is forged.

The finished bits (Fig. 5) produced by practising the present method are accurate as to size, concentric throughout their length, are free from fire defects or other defects incident to forging, and all the bits of a given size are uniform. Thus the auger bit for carpenter use which has heretofore been a tool of uncertain size and accuracy, has been by the present invention converted into a tool of precision.

Having thus described the invention, what I claim as new is:—

1. The method of making auger bits from a bar of round stock, which consists in the following steps taken in substantially the given order: turning on the end of the bar the part for the lead screw and spurs, cutting from the bar a length equal to the finished bit, forming the tang, turning down the shank, milling the spiral slot, cutting the lips and spurs, and threading the screw.

2. The method of making auger bits, which consists in turning the point and shank portions on a lathe, cutting the tang on a milling machine, cutting the spiral slot on another machine, and then forming the spurs and lips and threading the point.

3. The method of making auger bits from a bar of round stock of substantially the same size as the finished bit, which consists in countersinking one end of the bar for the lead screw and the spurs, cutting off from the bar a piece the length of the finished bit, forming the tang, turning down a portion of the bar to form the shank, cutting the spiral slot, forming the spurs and lips, cutting the lead screw, and grinding and polishing.

4. The method of making auger bits from a bar of round stock, which consists in turning the parts for the spurs, lead screw and shank, forming the tang, milling the spiral slot, cutting the lips, and finishing the spurs and lead screw.

5. The method of making auger bits from a bar of round stock of substantially the same size and length as the finished bit, which consists in machining the stock to form the lead screw, the spurs, the lips, the tang, and the shank, milling the spiral slot, and then grinding and polishing the bit.

6. The method of making auger bits from a bar of round stock of substantially the same size and length as the finished bit, which consists in machining the stock to form the lead screw, the spurs, the lips, the tang, and the shank, cutting the spiral slot so that the center stem or core thereof will taper from the point where the spiral joins the shank toward the cutting end of the bit, and then grinding and polishing the bit.

7. The method of making auger bits from a bar of round stock, which consists in turning the parts for the spurs, lead screw and shank, forming the tang, milling the spiral slot so that the center stem or core of the spiral will have a taper from the middle of the bit toward the cutting end thereof, cutting the lips, and finishing the spurs and lead screw.

LARNED S. WHITNEY.